United States Patent
David et al.

(10) Patent No.: US 10,129,594 B2
(45) Date of Patent: Nov. 13, 2018

(54) CONTENT-ACTIVATED INTELLIGENT, AUTONOMOUS AUDIO/VIDEO SOURCE CONTROLLER

(71) Applicant: Amplivy, Inc., Long Beach, CA (US)

(72) Inventors: Rodric David, Los Angeles, CA (US); Matthew Price, Los Angeles, CA (US); Paul Kolesa, Hermosa Beach, CA (US)

(73) Assignee: AMPLIVY, INC., Long Beach, CA (US)

( * ) Notice: Subject to any disclaimer, the term of this patent is extended or adjusted under 35 U.S.C. 154(b) by 0 days.

(21) Appl. No.: 15/465,011

(22) Filed: Mar. 21, 2017

(65) Prior Publication Data

US 2018/0278999 A1 Sep. 27, 2018

(51) Int. Cl.
| | |
|---|---|
| *H04N 21/462* | (2011.01) |
| *H04N 5/268* | (2006.01) |
| *H04N 21/222* | (2011.01) |
| *H04N 21/436* | (2011.01) |
| *H04N 21/81* | (2011.01) |
| *H04N 21/439* | (2011.01) |

(Continued)

(52) U.S. Cl.
CPC ......... *H04N 21/4622* (2013.01); *H04N 5/268* (2013.01); *H04N 21/222* (2013.01); *H04N 21/4394* (2013.01); *H04N 21/43635* (2013.01); *H04N 21/43637* (2013.01); *H04N 21/44008* (2013.01); *H04N 21/812* (2013.01); *H04N 21/8126* (2013.01); *H04N 21/8173* (2013.01)

(58) Field of Classification Search
CPC ............. H04N 21/4622; H04N 21/222; H04N 21/43635; H04N 21/43637; H04N 21/4394; H04N 21/44008; H04N 21/812; H04N 21/8126; H04N 21/8173; H04N 5/268

See application file for complete search history.

(56) References Cited

U.S. PATENT DOCUMENTS

| | | |
|---|---|---|
| 5,343,251 A | 8/1994 | Nafeh |
| 6,593,976 B1 | 7/2003 | Lord |
| 9,621,929 B1 * | 4/2017 | Chenillo .......... H04N 21/23424 |

(Continued)

OTHER PUBLICATIONS

International Searching Authority, International Search Report and Written Opinion of the ISA, Int'l App. No. PCT/US18/22660, dated Jul. 12, 2018.

*Primary Examiner* — Brian P Yenke
*Assistant Examiner* — Sean N. Haiem
(74) *Attorney, Agent, or Firm* — The Hecker Law Group, PLC

(57) ABSTRACT

An intelligent audio/video source switcher and controller that automatically switches the input source based on a change in an incoming audio/video signal (for example, upon detection of a commercial break), devices that connect to the source switcher and controller, and methods for using the same, are presented. The switcher allows playback of media stored in memory of the switcher or streamed to the switcher via a network connection, thereby allowing commercial breaks in a television broadcast to be replaced with alternate content, such as alternate advertising or entertainment. In one or more embodiments, the apparatus of the present invention includes a control server configured to send commands to the switcher via a network to instruct the switcher to switch audio/video inputs, play back alternate media, or download media and/or software updates.

18 Claims, 7 Drawing Sheets

(51) Int. Cl.
*H04N 21/44* (2011.01)
*H04N 21/4363* (2011.01)

(56) References Cited

U.S. PATENT DOCUMENTS

| | | |
|---|---|---|
| 2003/0004966 A1 | 1/2003 | Bolle et al. |
| 2004/0143842 A1* | 7/2004 | Joshi .................... H04W 24/00 |
| | | 725/32 |
| 2004/0228605 A1* | 11/2004 | Quan ...................... H04N 5/76 |
| | | 386/251 |
| 2005/0240967 A1* | 10/2005 | Anderson ................ H04N 5/50 |
| | | 725/52 |
| 2007/0266400 A1* | 11/2007 | Rogers ................... H04N 7/162 |
| | | 725/42 |
| 2008/0168500 A1 | 7/2008 | Carlson et al. |
| 2010/0228877 A1* | 9/2010 | Davenport, Jr. ..... H04H 20/103 |
| | | 709/231 |
| 2010/0262987 A1* | 10/2010 | Imanilov .............. H04H 20/106 |
| | | 725/9 |
| 2015/0040176 A1 | 2/2015 | Hybertson et al. |
| 2015/0095932 A1 | 4/2015 | Ren |
| 2015/0162006 A1 | 6/2015 | Kummer |
| 2016/0227261 A1* | 8/2016 | Neumeier ........ H04N 21/23439 |
| 2016/0366463 A1* | 12/2016 | Wang ............... H04N 21/41407 |
| 2017/0064412 A1* | 3/2017 | Taxier ................. H04N 21/8133 |
| 2018/0027269 A1* | 1/2018 | Chenillo .......... H04N 21/23424 |
| | | 725/32 |

* cited by examiner

CONTENT-ACTIVATED INTELLIGENT, AUTONOMOUS AUDIO/VIDEO SOURCE CONTROLLER

BACKGROUND OF THE INVENTION (1) Field of the Invention

The present invention relates generally to audio/video source switching and control devices, and more particularly to an intelligent, autonomous audio/video source controller that automatically switches the input source upon detection of commercial breaks, devices that connect to the source controller, and methods for using the same.

(2) Description of the Related Art

Audio/video source switching and control devices ("switchers" or "controllers") are electronic devices that allow a user to selectively route audio/video signals ("input signals") received at the switcher's input ports ("inputs") from one or more audio/video signal sources ("sources") to one or more of the switcher's output ports ("outputs"). Audio/video sources commonly used to provide input signals to a switcher's inputs include cable/satellite receiver boxes, over-the-air broadcast television receivers, Internet video streaming devices (e.g., Apple TV, Amazon Fire TV, Roku, etc.), digital video recorders, DVD/Blu-Ray players, portable computers, video game consoles, and video cameras, among others. Devices commonly connected to the outputs of a switcher include television or monitor displays, projectors, video recorders, and wireless video streaming devices, among others. Audio/video source switchers thus allow several audio/video source devices to be connected to a device that may have only one input (such as a projector), or a limited number of inputs (such as a television with only two or three video inputs). Audio/video signal formats commonly used with switchers include High-Definition Multimedia Interface ("HDMI"), Serial Digital Interface ("SDI"), analog component video (e.g., RGB or $YP_RP_B$ format), analog composite video, digital audio (e.g., S/PDIF), and analog stereo audio. Audio/video source switchers may also convert between signal formats (e.g., from analog component video input to HDMI output) to enable the connection of otherwise incompatible input and output devices.

Examples of prior art audio/video source switchers and controllers include home audio/video "switch boxes" and audio/video receivers that accept multiple input signals and allow the user to selectively route one of those signals at a time to a destination, such as a television display. Prior art switchers and controllers also include more complex "matrix switchers" with multiple inputs and multiple outputs that allow routing of multiple simultaneous video streams, which are commonly used in conference rooms and video production studios.

Prior art audio/video source switching devices do not automatically switch input sources based on a change in the incoming audio/video signal, for example, when programming is interrupted by a commercial break. Prior art audio/video source switching devices also do not distribute the audio component of their source input signals over a network so that users may listen to the audio with a mobile device. Furthermore, prior art audio/video source switching devices do not include one or more onboard audio/video sources among the switched input sources, nor are many prior art devices compact enough to be physically mounted adjacent to or on a television or display monitor.

BRIEF SUMMARY OF THE INVENTION

An intelligent audio/video source switcher and controller that automatically switches the input source based on a change in the incoming audio/video signal (for example, upon detection of a commercial break), devices that connect to the source switcher and controller, and methods for using the same, are presented. In one or more embodiments, the apparatus of the present invention allows playback of media stored in memory or streamed via a network connection, thereby allowing commercial breaks in a television broadcast to be replaced with alternate content, such as alternate advertising or entertainment content. In one or more embodiments, the apparatus of the present invention includes an embedded computer system ("switcher") with a microprocessor and memory, one or more audio and/or video source inputs, and one or more audio and/or video outputs. In one or more embodiments, the switcher includes one or more wired and/or wireless computer network interfaces and is configured to connect to one or more wired and/or wireless networks.

In one or more embodiments, the switcher is configured to selectively connect one of the audio and/or video source inputs to one or more of the audio and/or video outputs based on the detection of a change in the incoming audio/video signal, for example by software instructions executing on the microprocessor of the switcher. In one or more embodiments, one or more of the audio and/or video source input signals is generated onboard the switcher by software instructions executing on the microprocessor of the switcher; from image, video, or audio data stored in the memory of the switcher; from image, video, or audio data streamed via a network connection; or by a combination thereof. In one or more embodiments, the switcher is configured to receive audio data streamed from another device on the network and immediately route that audio to one or more of the audio outputs for use as a public address system. In one or more embodiments, one or more of the switcher's outputs are High Definition Multimedia Interface ("HDMI") ports, which allow the switcher to send commands to a connected display via the HDMI Consumer Electronics Control ("CEC") channel. In one or more embodiments, the switcher can send CEC commands to power the display on or off, change the channel, change the display input source, change or mute the audio volume, display text messages onscreen, turn closed captioning on or off, or change the picture aspect ratio, among others.

In one or more embodiments, the apparatus of the present invention includes a control server configured to send commands to the switcher via a computer network. In one or more embodiments, the switcher is configured to selectively route one of the audio and/or video source input signals to one or more of the audio and/or video outputs in response to the commands received from the control server.

In one or more embodiments, the controller is configured to create a wireless computer network (e.g., an "infrastructure mode" Wi-Fi network). In one or more embodiments, the switcher is configured to stream the audio data from one or more of the audio source inputs over a wired and/or wireless network. In one or more embodiments, the switcher is configured to stream the audio data from a separate auxiliary audio input over a wired and/or wireless network. In one or more embodiments, the apparatus of the present invention includes one or more receiving devices (e.g., mobile phones, tablet computers, laptop computers, etc.) configured to connect to the wired and/or wireless network and receive one or more audio data streams from the switcher via the network. In one or more embodiments, the receiving devices are configured to display additional content, such as information, special offers, games, advertising, or other content, to the users of the receiving devices in connection with the audio and video routed through the switcher.

In one or more embodiments, the apparatus of the present invention includes a supplemental audio output control device to facilitate connection of the switcher to a separate audio/video amplifier or distribution unit ("amplifier"). In one or more embodiments, the supplemental audio output control device includes a microprocessor, memory, one or more audio source inputs, and an audio output. In one or more embodiments, the supplemental audio output control device includes a computer network interface and is configured to connect to a network. In one or more embodiments, the supplemental audio output control device is configured to selectively connect one of the audio source inputs to the audio output by software instructions executing on the microprocessor of the supplemental audio output control device in response to commands received from the switcher either over a network, or alternatively, via a coded signal sent to one of the audio source inputs of the supplemental audio output control device from an audio output of the switcher.

In one or more embodiments, the audio portions of one or more audio/video sources, along with an audio output of the switcher, are connected to the audio source inputs of the supplemental audio output control device. In one or more embodiments, the audio output of the supplemental audio output control device is connected to one or more audio inputs of the amplifier. In one or more embodiments, the video portions of one or more audio/video source signals are connected to the video inputs of the amplifier. In one or more embodiments, the audio output of the amplifier is connected to loudspeakers, and the video output of the amplifier is connected to a video input of the switcher. Thus, the supplemental audio output control device allows selective routing of either the audio generated onboard the switcher or audio from one or more audio/video sources to the amplifier so that the audio from the source selected by the switcher is played over the loudspeakers.

BRIEF DESCRIPTION OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

An intelligent audio/video source switcher and controller that automatically switches the input source based on a change in the incoming audio/video signal (for example, upon detection of a commercial break), devices that connect to the source switcher and controller, and methods for using the same, are presented. In one or more embodiments, the apparatus of the present invention allows playback of media stored in memory or streamed via a network connection, thereby allowing commercial breaks in a television broadcast to be replaced with alternate content, such as alternate advertising or entertainment content. In one or more embodiments, the switching apparatus of the present invention ("switcher") includes an embedded computer system with a microprocessor and memory, one or more audio and/or video source inputs, and one or more audio and/or video outputs. In one or more embodiments, the switcher includes one or more wired and/or wireless computer network interfaces and is configured to connect to one or more wired and/or wireless networks. In the embodiments of the invention shown in the Figures, a solid arrow generally indicates a wired connection and a dashed arrow generally indicates a wireless connection. However, in particular embodiments of the invention, one or more of the wired connections shown in the Figures may instead be replaced with a wireless connection, and one or more of the wireless connections shown in the Figures may instead be replaced with a wired connection.

Figure 1:
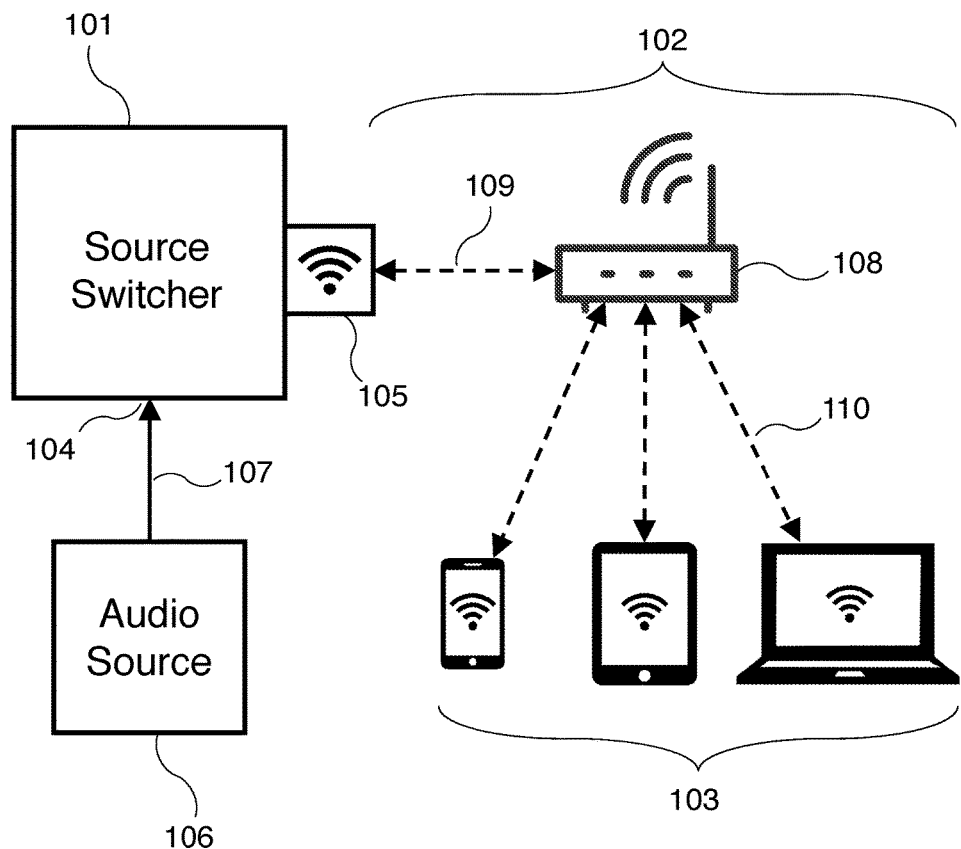
FIG. 1 is a block diagram of a switcher configured to stream audio data over a computer network to one or more mobile devices according to an embodiment of the present invention.

FIG. 1 is a block diagram of a switcher 101 configured to stream audio data over a computer network 102 to one or more mobile devices 103, in accordance with an embodiment of the present invention. In the embodiment of FIG. 1, switcher 101 comprises an embedded computer system with a microprocessor and memory, an audio input 104, and network interface 105. In one or more embodiments, the embedded computer system of switcher 101 is a custom hardware design specifically tailored to provide the functionality of switcher 101. Alternatively, in one or more embodiments, the embedded computer system of switcher 101 uses a commercially available embedded computer system, such as a Raspberry Pi or Arduino device, or a Field-Programmable Gate Array ("FPGA") board. However, the functionality of switcher 101 may be provided by any computer system with suitable input and output hardware, including a conventional desktop or laptop computer, or a tablet computer, mobile phone, or similar device.

In the embodiment of FIG. 1, network interface 105 is a wireless network interface to allow connection of switcher 101 to a Wi-Fi network. Alternatively, network interface 105 may be a wired Ethernet network interface or any other type of computer network interface. In the embodiment of FIG. 1, network interface 105 connects switcher 101 to wireless network access point 108 via wireless network connection 109, and thereby to computer network 102. Note that while a single wireless network access point 108 is shown, computer network 102 may have a more complex topology with multiple wireless network access points and/or wired switches, routers, gateways, and other network equipment. For example, if network interface 105 of switcher 101 is a wired network interface, network connection 109 is a wired network connection to computer network 102 via, for example, wireless network access point 108 or via a wired switch or other network equipment.

In the embodiment of FIG. 1, one or more mobile devices 103 are connected to wireless network access point 108 via wireless network connections 110, and thereby to computer network 102. Alternatively, one or more mobile devices 103 may be connected to computer network 102 via wired Ethernet network connections or any other type of network connection. Mobile devices 103 are thus able to send data to and receive data from switcher 101 via computer network 102. Mobile devices 103 may be mobile phones, tablet computers, laptop computers, digital audio players, or any other device capable of connecting to computer network 102.

In the embodiment of FIG. 1, the audio signal provided by audio source 106 is connected to audio input 104 via audio input connection 107, which may provide a digital or analog connection between audio source 106 and audio input 104 via wires, optical fiber, wireless radio, or any other method of transmitting audio between devices. Switcher 101 may have more than one audio input 104, with a separate audio source 106 connected to each audio input 104 via a separate audio input connection 107.

In the embodiment of FIG. 1, switcher 101 is configured (using hardware, software executing on the microprocessor of switcher 101, or a combination thereof) to receive audio via audio input 104, and stream the audio over computer network 102 to mobile devices 103 (for example, by opening an Internet Protocol ("IP") connection to each mobile device 103 and sending User Datagram Protocol ("UDP") or Transmission Control Protocol ("TCP") packets containing audio data to mobile device 103). If the audio received by switcher 101 is analog, switcher 101 first digitizes the received audio to produce a digital audio data stream. In one or more embodiments, switcher 101 then encodes the digital audio stream into a compressed audio format, such as MP3, AAC, or any other digital audio format. Alternatively, switcher 101 may stream the uncompressed audio data. In one or more embodiments, switcher 101 optionally encrypts the data before streaming over computer network 102 so that only devices with the decryption key (e.g., devices running authorized software) are able to decode the encrypted audio stream. In one or more embodiments, switcher 101 may broadcast audio from audio received via input 104 via a radio transmitter (e.g., an FM radio transmitter).

In one or more embodiments, mobile devices 103 are configured (e.g., using software executing on the microprocessor of each mobile device 103) to locate switcher 101 on computer network 102 (using a network discovery service such as Multicast DNS, by querying a directory or database server, or by any other network discovery method) and subsequently connect to switcher 101, request an audio data stream, receive the audio data stream, and play back the audio data stream via speakers or headphones.

Figure 2:
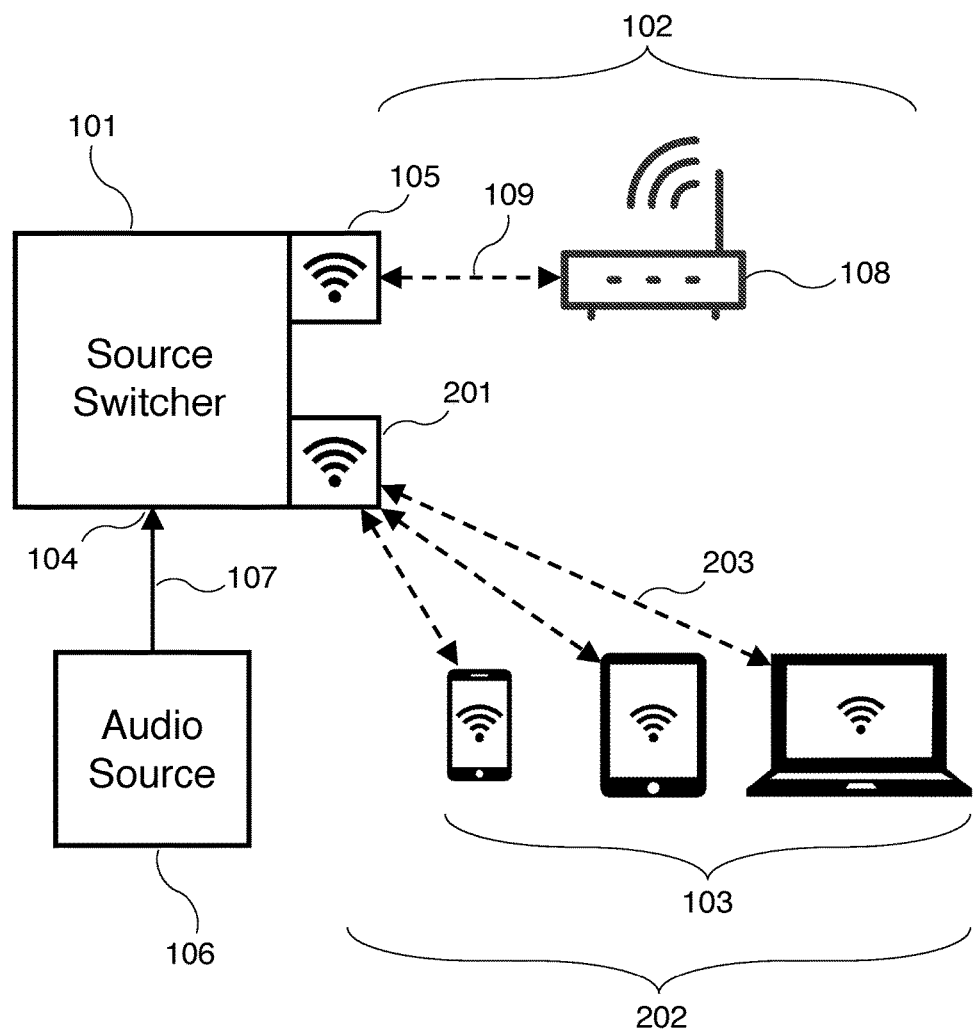
FIG. 2 is a block diagram of a switcher configured to stream audio data over a separate computer network created by the switcher to one or more mobile devices according to an embodiment of the present invention.

FIG. 2 is a block diagram of a switcher 101 configured to stream audio data over a separate computer network 202 created by switcher 101 to one or more mobile devices 103, in accordance with an embodiment of the present invention. The configuration of switcher 101 and attached devices in the embodiment of FIG. 2 is similar to the embodiment of FIG. 1, except that switcher 101 has two network interfaces 105 and 201. Switcher 101 connects to computer network 102 via network interface 105. Computer network 102 is used by switcher 101 for general network and/or Internet connectivity (for example, to allow remote control of switcher 101 by one or more other computers on network 102, or to download software and media content updates, among other uses). Switcher 101 uses network interface 201 to create a separate computer network 202 that is used for streaming audio data to mobile devices 103. Such a configuration is useful, for example, in a location with many switchers 101 and many more mobile devices 103 connected to each switcher 101, as in a sports bar or other location with many television displays each showing different audio/video content. Because each Wi-Fi access point can only accommodate a limited number of connected devices, the separate computer network 202 created by each switcher 101 allows many more mobile devices 103 to receive audio from switchers 101 without overwhelming a single access point 108 on the network.

As described above with reference to FIG. 1, network interface 105 is a wireless or wired network interface that connects switcher 101 to wireless network access point 108 (or other network equipment) via wireless or wired network connection 109, and thereby to computer network 102. In the embodiment of FIG. 2, network interface 201 is a wireless network interface. Switcher 101 is configured to create a wireless computer network (e.g., an "infrastructure mode" Wi-Fi network) using network interface 201. In one or more embodiments, switcher 101 is configured to stream audio data over computer network 202 to mobile devices 103 in accordance with the method described above with reference to FIG. 1.

Figure 3:
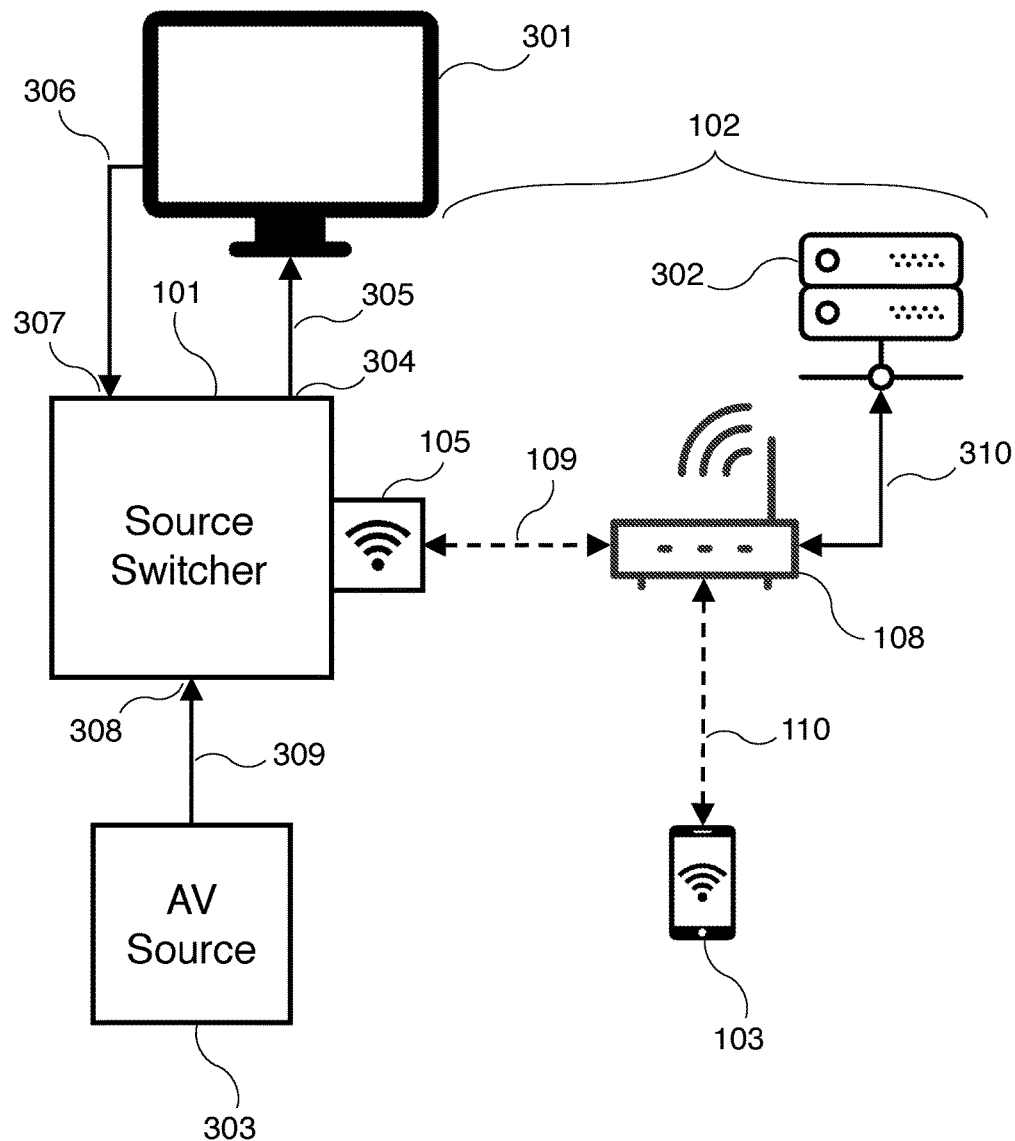
FIG. 3 is a block diagram of a switcher configured to route audio/video signals to a television display and receive commands from a control server according to an embodiment of the present invention.

FIG. 3 is a block diagram of a switcher configured to connect audio/video signals to a television display monitor or other audio/video monitor and receive commands from a control server, in accordance with an embodiment of the present invention. The configuration of switcher 101 and attached devices in the embodiment of FIG. 3 is similar to the embodiment of FIG. 1, except that monitor 301 is connected to switcher 101, control server 302 is connected to computer network 102, and audio source 106 is replaced by audio/video source 303.

In the embodiment of FIG. 3, switcher 101 has audio/video output 304 which is connected to monitor 301 via audio/video connection 305. Audio/video output 304 and audio/video output connection 305 may comply with HDMI or DisplayPort interface and signal transport standards, which allow transport of both audio and video data over the same cable, or alternatively or in addition may comply with DVI, VGA, $YP_RP_B$ component video, S-video, composite video, or any other digital or analog video interface standards in combination with any method of transmitting digital or analog audio data. In one or more embodiments, monitor 301 may have an audio output connected via audio return channel 306 to audio return input 307 of switcher 101.

In the embodiment of FIG. 3, audio/video source 303 is connected to audio/video input 308 of switcher 101 via audio/video input connection 309. Audio/video input 308 and audio/video input connection 309 may comply with HDMI or DisplayPort interface and signal transport standards, which allow transport of both audio and video data over the same cable, or alternatively or in addition may comply with DVI, VGA, $YP_RP_B$ component video, S-video, composite video, or any other digital or analog video interface standards in combination with any method of transmitting digital or analog audio data. In one or more embodiments, more than one audio/video source 303 may be connected to switcher 101, each via a separate audio/video input connection 309 to a separate audio/video input 308 on switcher 101.

In the embodiment of FIG. 3, switcher 101 is configured (using hardware, software executing on the microprocessor of switcher 101, or a combination thereof) to generate an audio/video signal onboard switcher 101 without an external audio/video input. For example, switcher 101 may include an internal audio/video source that is configured to generate an audio/video signal from image, video, or audio data stored in the memory of switcher 101; from image, video, or audio data streamed to switcher 101 via computer network 102; or from a combination thereof. In one or more embodiments, switcher 101 may send the generated audio/video signal to monitor 301 via audio/video output 304 and audio/video output connection 305 instead of or in addition to sending the audio/video signal received from audio/video source 303.

In one or more embodiments, switcher 101 is configured to selectively connect one of the audio/video source inputs 308 or the audio/video signal generated onboard switcher 101 to monitor 301 via audio/video output 304 and audio/video output connection 305. In one or more embodiments, switcher 101 is configured to combine one or more of the audio/video signals received via audio/video source inputs 308 and/or the audio/video signal generated onboard switcher 101 into a single signal to be routed to monitor 301. For example, switcher 101 may display the images or video generated onboard switcher 101 in a "picture-in-picture" window overlaid on the video signal received via audio/video source input 308. Alternatively, if the video signal from audio/video source input 308 is in 4:3 aspect ratio (or is converted by switcher 101 to a 4:3 aspect ratio), switcher 101 may display the images or video generated onboard switcher 101 to either side of the 4:3 video signal to produce a 16:9 aspect ratio video signal with images or video filling the "black bars" that would otherwise accompany the 4:3 video signal.

In one or more embodiments, switcher 101 is configured (using hardware, software executing on the microprocessor of switcher 101, or a combination thereof) to detect changes in the incoming audio/video signal received via audio/video source input 308 or the audio signal received via audio return input 307 and apply a set of rules to determine whether to change to a different audio/video source input 308 or the audio/video signal generated onboard switcher 101. For example, switcher 101 may be configured to switch inputs upon heuristic detection of a commercial break in television programming received from audio/video source 303. In one or more embodiments, commercial breaks are detected because they typically have a higher average audio volume level than that of the television program. In one or more embodiments, when the incoming audio exceeds a threshold for change in average volume level over a predefined duration (e.g., the last five minutes), switcher 101 switches inputs. In one or more embodiments, commercial breaks are detected by abrupt changes in the video signal, such as large differences in brightness, contrast, or color across large regions of the display. In such embodiments, when incoming video exceeds thresholds for changes in average brightness, contrast, or color over a predefined duration, or a combination thereof, switcher 101 switches inputs. In one or more embodiments, commercial breaks are detected by monitoring the closed-captioning ("CC") data in the video signal for words or phrases indicating a commercial break. In such embodiments, when a threshold number of words are detected that indicate a commercial break, switcher 101 switches inputs. In one or more embodiments, commercial breaks are detected by a combination of the above methods, optionally assigning a weight to each detection method to fine-tune and maximize the accuracy of commercial break detection. In one or more embodiments, switcher 101 introduces a small time delay (e.g., one or two seconds), for example by using a buffer or other electronic delay, as is well known in the art, when routing audio/video source input 308 to audio/video output 304 to allow switcher 101 time to analyze the incoming audio/video signal, detect commercial breaks, and switch inputs without displaying the first few seconds of the commercial break.

In one embodiment, commercial breaks are detected by switcher 101 by analyzing the incoming audio/video signal from audio/video source input 308 to detect a zero-level audio signal followed by or concurrent with six or more black video frames. This "threshold condition" is commonly present at the beginning of a commercial break because the audio/video signal from the main television program briefly stops before the audio/video signal from the commercial break begins, and the combination of a zero-level audio signal followed by or concurrent with six or more black video frames is not otherwise common in typical television programming. To verify that the threshold condition represents an actual commercial break and is not part of the main television program, switcher 101 samples one or more video frames following the sequence of black video frames and produces a "fingerprint" of the video signal following the sequence of black video frames, and checks that fingerprint against a database of known commercial fingerprints. For example, switcher 101 may sample the fifth, tenth, and twentieth video frame after the sequence of black video frames (and digitize those sample frames, if they are from an analog video signal), concatenate those video frames into a single image, then generate a fingerprint of that single image using a mathematical hash function that produces a hash value (i.e., a short sequence of bits). Switcher 101 looks up the hash value in a database of known commercial fingerprints, and if the hash value represents a commercial, switcher 101 switches the input from audio/video source input 308 to a different audio/video source input 308 or to the audio/video signal generated onboard switcher 101. In one or more embodiments, the database is a relational database. In one or more embodiments, the database is located on the computer system of switcher 101. Alternatively, in one or more embodiments, the database is located on a different switcher 101 accessible via computer network 102, on control server 302 described below, or on a remote server accessible via the Internet. In one or more embodiments, each fingerprint in the database is associated with additional information that identifies the brand or sponsor of the fingerprinted commercial. Switcher 101 may select an alternate commercial generated onboard switcher 101 in place of one or more fingerprinted commercials.

After switching the signal connected to output 304, switcher 101 continues to monitor and fingerprint the audio/video signal received at input 308 to determine when to switch the signal connected to output 304 back to the main television program. Each zero-level audio signal followed by or concurrent with six or more black video frames (indicating a separate commercial) is fingerprinted by switcher 101 and checked against the database of known commercial fingerprints. In one or more embodiments, switcher 101 may select additional alternate commercials generated onboard switcher 101 by the onboard audio/video source in place of each fingerprinted commercial as described above. When switcher 101 finally encounters a fingerprint that does not match any fingerprint found in the database (indicating the end of the commercial break), switcher 101 switches the signal connected to output 304 back to the original audio/video signal received via input 308.

In a preferred embodiment, the mathematical hash function used by switcher 101 to fingerprint the incoming video signal is a perceptual image hash function known in the prior art, such as the "difference hash" algorithm, which is specifically designed to produce hash values that differ by only a small amount when given input images differ by only a small amount. Thus, small differences or errors in the incoming video signal, or differences or errors introduced in the process of transforming that incoming video signal into an image for hashing, will not significantly alter the resulting hash value. Switcher 101 then may perform a "fuzzy" database lookup where a hash value matches one or more values in the database of known commercial fingerprints within a certain specified range.

In one or more embodiments, switcher 101 is not configured to detect commercial breaks or other changes in the incoming audio/video signal, but instead to switch the signal connected to output 304 upon receiving commands from another device. In the embodiment of FIG. 3, control server 302 is connected to computer network 102 via network connection 310. Control server 302 is configured to send commands to switcher 101 via computer network 102. Switcher 101 is configured to selectively route the signal received via one of the audio/video source inputs 308 or the audio/video signal generated onboard switcher 101 to monitor 301 via audio/video output 304 and audio/video output connection 305 in response to the commands received from control server 302.

In one or more embodiments, control server 302 is configured to send commands to switcher 101 to switch the signal connected to output 304 according to a schedule stored in the memory of control server 302. For example, when the timing of commercial breaks is known in advance, as with pre-recorded or time-shifted television programming, control server 302 may be configured with the schedule of commercial breaks in advance and subsequently send commands to switcher 101 according to that schedule. In one or more embodiments, control server 302 is configured to send commands to switcher 101 to switch the signal connected to output 304 at the direction of a human operator. For example, during a live television event, a human operator may watch the television program and manually command switcher 101 to switch signals during commercial breaks. The human operator need not be in the same location as either control server 302 or switcher 101, and a single human operator may command many control servers 302 or switchers 101 from a central location. Thus, during a live television event, such as a televised sporting event, a single human operator at a central location may control many switchers 101 at separate locations, such as sports bars, that are showing the event.

In one or more embodiments, control server 302 has one or more audio/video inputs which control server 302 also uses to monitor and fingerprint the incoming audio/video signal as described above in reference to switcher 101. Control server 302 is configured to allow a system administrator to manually identify commercials, add those manually identified commercials to the database, and optionally to identify the brand or sponsor of each commercial for use by switcher 101 as described above.

In one or more embodiments, switcher 101 is configured to receive audio data streamed from another device on the network (such as control server 302) and immediately route that audio to monitor 301 via audio/video output 304 and audio/video output connection 305, or to mobile devices 103 receiving streaming audio from switcher 101. Switcher 101 may thus be used as a public address system to broadcast live messages in an environment such as a restaurant or bar.

In one or more embodiments, switcher 101 sends commands to monitor 301 via the HDMI Consumer Electronics Control ("CEC") channel. In one or more embodiments, the switcher can send CEC commands to power monitor 301 on or off, change the channel (if monitor 301 comprises a television receiver), change the monitor's input signal source, change or mute the audio volume, display text messages onscreen, turn closed captioning on or off, or change the picture aspect ratio, among others, if the monitor has such capabilities.

In one or more embodiments, mobile devices 103 are configured to connect to switcher 101 via computer networks 102 and/or 202 and receive notifications or other data from switcher 101 causing the mobile devices 103 to display additional content relating to the audio and video routed through switcher 101, such as information, special offers, games, advertising, or other content. In one or more embodiments, switcher 101 sends a notification to mobile devices 103 whenever switcher 101 switches the audio/video signal being streamed to the mobile devices, and mobile devices 103 are configured to locate and retrieve the additional content from a server on computer networks 102 and/or 202, or from a server on the Internet in response to such notifications. Alternatively, the additional content may be provided by switcher 101 as an audio, video, or other data stream to mobile devices 103.

In one or more embodiments, switcher 101 includes an onboard microphone. In one or more embodiments, switcher 101 uses the microphone to collect ambient sound present in the environment around switcher 101 and perform actions in response to audio cues in a similar manner to the "always on" microphones found in prior art devices like the Amazon Echo, Apple TV, or Android TV.

In one or more embodiments, switcher 101 uses the ambient sound to detect commercials using the commercial fingerprinting method described above. For example, in one or more embodiments, switcher 101 is connected to one of the HDMI inputs of display 301. Another audio/video source, e.g., a streaming stick, is connected to a different HDMI input of display 301 and is currently playing audio/video content on display 301. Switcher 101 determines that display 301 has not selected switcher 101 as the active input by observing data on the HDMI CEC channel. Switcher 101 then listens to the sound produced by the speakers of display 301. When switcher 101 detects that a commercial begins playing on display 101 using the commercial fingerprinting method described above, switcher 101 sends a notification to mobile devices 103 as described above. Mobile devices 103 then present additional content related to the commercial to their users in response to the commercial that is playing on display 301.

In one or more embodiments, switcher 101 uses the ambient sound to detect audio/video content other than commercials. For example, in one or more embodiments, switcher 101 is connected to one of the HDMI inputs of display 301. Another audio/video source, e.g., a video game console, is connected to a different HDMI input of display 301 and is currently playing audio/video content from a video game on display 301. Switcher 101 determines that display 301 has not selected switcher 101 as the active input by observing data on the HDMI CEC channel. Switcher 101 then listens to the sound produced by the speakers of display 301. When switcher 101 detects certain audio cues corresponding to events in the video game playing on display 101 (using a method like the commercial fingerprinting method described above), switcher 101 sends a notification to mobile devices 103 as described above. Mobile devices 103 then present additional content related to the game to their users in response to the video game that is playing on display 301.

In one or more embodiments, switcher 101 uses the ambient sound to detect voice commands or other audio cues. For example, in one or more embodiments, switcher 101 listens for key words used to control other smart devices, such as "OK Google", "Alexa", "Siri", or "Cortana". When switcher 101 detects such a key word, switcher 101 sends a notification to mobile devices 103 as described above. Mobile devices 103 then present additional content related to that smart device (e.g., an advertisement for that brand of smart device or for a different brand of smart device) to their users.

Figure 4:
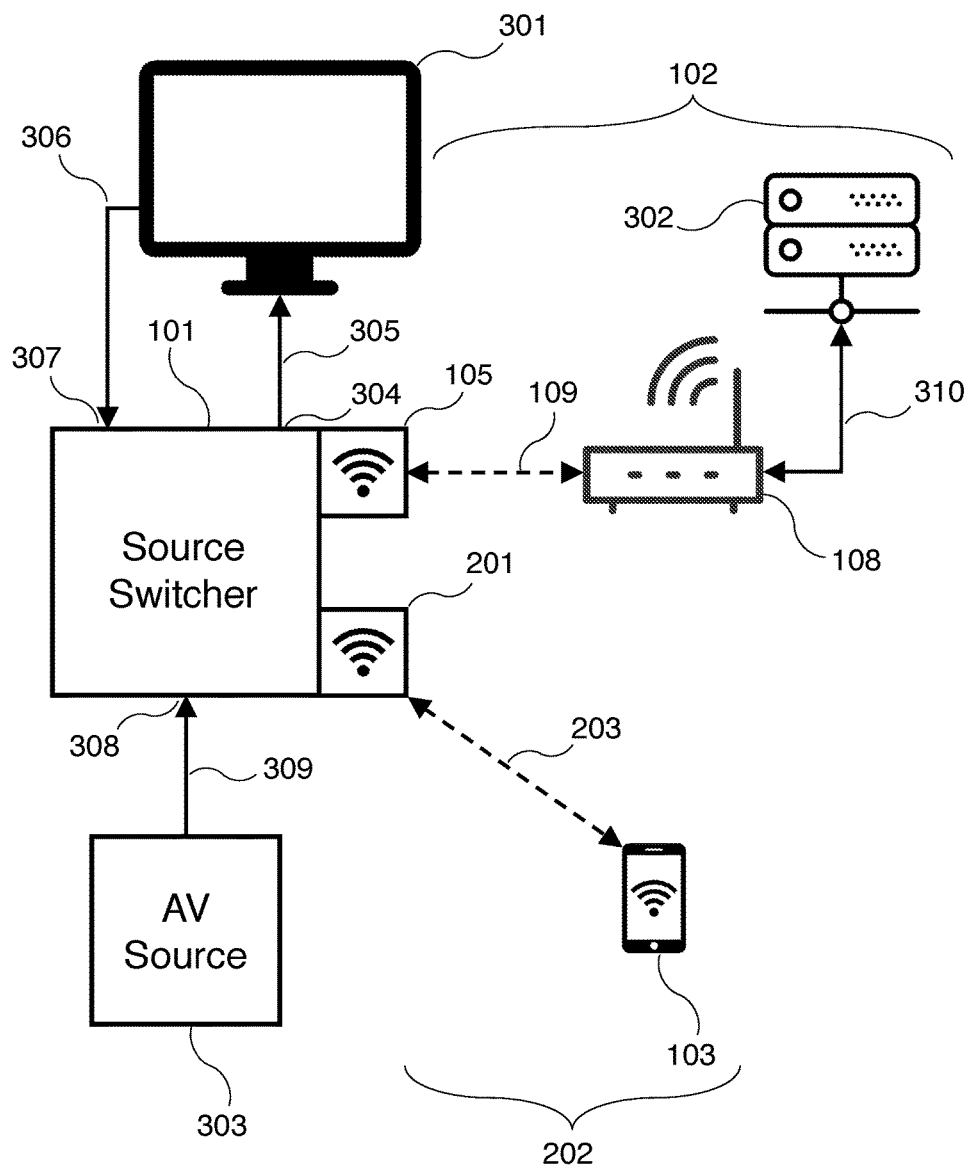
FIG. 4 is a block diagram of a switcher configured to route audio/video signals to a television display and receive commands from a control server according to an embodiment of the present invention.

FIG. 4 is a block diagram of a switcher configured to route audio/video signals to a television display or other audio/video monitor and receive commands from a control server, in accordance with an embodiment of the present invention. The configuration of switcher 101 and attached devices in the embodiment of FIG. 4 is similar to the embodiment of FIG. 3, except that switcher 101 has two network interfaces 105 and 201 as described above with reference to FIG. 2. Switcher 101 uses network interface 201 to create a separate computer network 202 that is used for streaming audio or audio/video data to mobile devices 103. Such a configuration is useful, for example, in a location with many switchers 101 and many more mobile devices 103 connected to each switcher 101, as in a sports bar or other location with many television displays each showing different audio/video content. Because each Wi-Fi access point can only accommodate a limited number of connected devices, the separate computer network 202 created by each switcher 101 allows many more mobile devices 103 to receive audio from switchers 101 without overwhelming a single access point 108 on the network.

Figure 5:
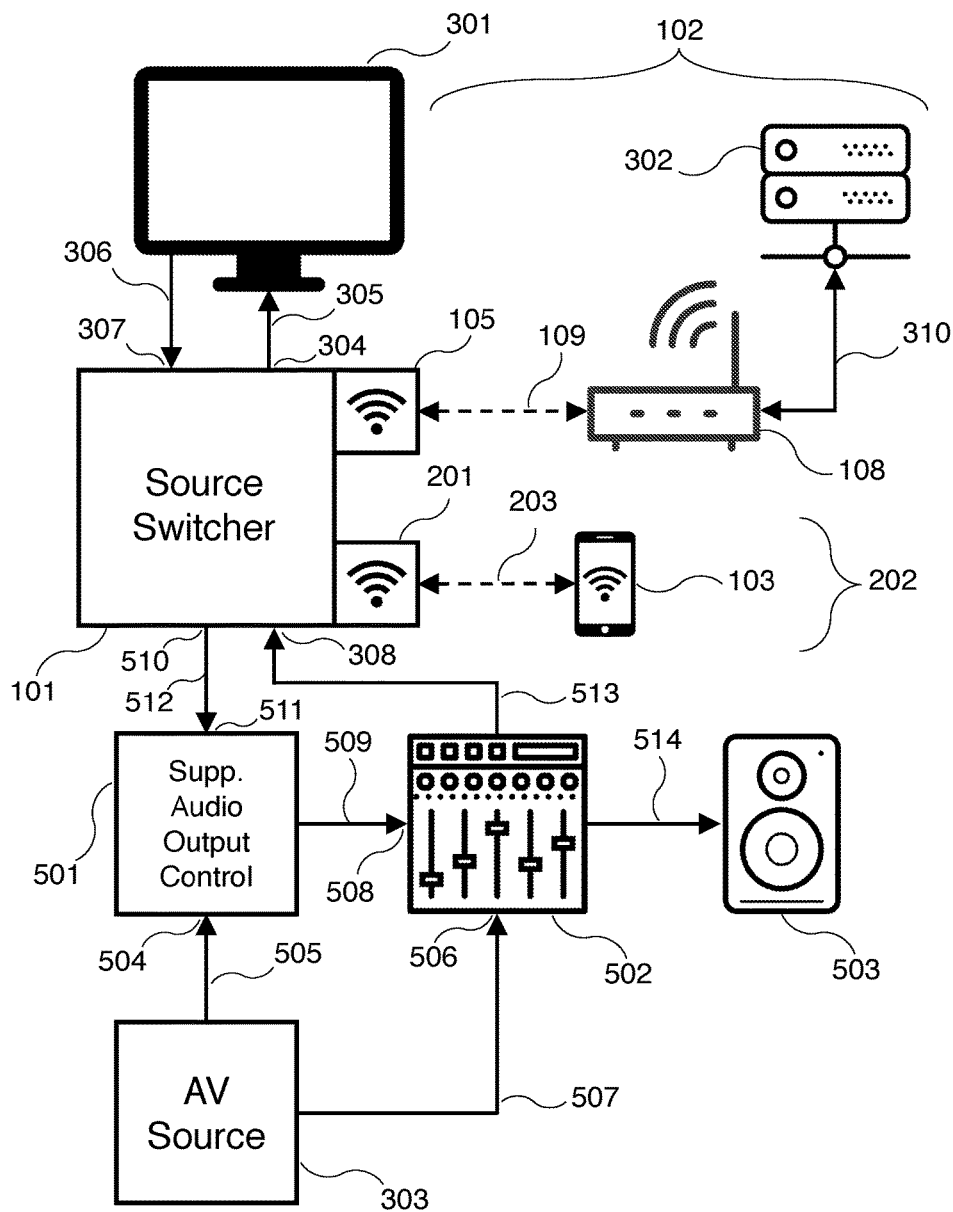
FIG. 5 is a block diagram of a switcher, supplemental audio output control device, amplifier, and loudspeakers according to an embodiment of the present invention.

FIG. 5 is a block diagram of a switcher 101, supplemental audio output control device 501, amplifier 502, and loudspeakers 503, in accordance with an embodiment of the present invention. The configuration of switcher 101 and attached devices in the embodiment of FIG. 5 is similar to the embodiment of FIG. 4, except that supplemental audio output control device 501, amplifier 502, and loudspeakers 503 are connected to switcher 101 and audio/video source 303. Instead of being directly connected to switcher 101, the audio output of audio/video source 303 is connected to audio source input 504 of supplemental audio output control device 501 via audio source input connection 505, and the video output of audio/video source 303 is connected to video source input 506 of amplifier 502 via video source input connection 507. The audio output of supplemental audio output control device 501 is connected to audio source input 508 of amplifier 503 via audio source input connection 509. Audio output 510 of switcher 101 (which may be part of audio/video output 304, or a separate audio output) is connected to audio source input 511 of supplemental audio output control device 501 via audio source input connection 512. The video output of amplifier 502 is connected to the audio/video input 308 of switcher 101 via audio/video input connection 513, and the audio output of amplifier 502 is connected to one or more loudspeakers 503 via audio connection 514.

In the embodiment of FIG. 5, supplemental audio output control device 501 allows audio generated onboard switcher 101 to be directed to loudspeakers 503 when a separate amplifier 502 is used to distribute the audio associated with audio/video content shown on monitor 301. Supplemental audio output control device 501 includes a microprocessor, memory, audio source inputs 504 and 511, and an audio output. In one or more embodiments, supplemental audio output control device 501 includes a computer network interface and is configured to connect to a network. In one or more embodiments, the supplemental audio output control device 501 is configured to selectively connect one of the audio source inputs 504 and 511 to its audio output according to software instructions executing on the microprocessor of supplemental audio output control device 501 in response to commands received from switcher 101 either over one or more of computer networks 102 or 202, or alternatively, via a coded signal (e.g., an inaudible high-frequency tone) sent to audio source input 511 from switcher 101. Thus, when switcher 101 switches its output signal sent to input 511 of supplemental audio control device 501 from the signal received via audio/video source input 308 to the audio/video signal generated by the audio/video source onboard switcher 101, switcher 101 is configured to send a signal to supplemental audio output control device 501 to connect audio source input 511 to amplifier 502 so that the audio from switcher 101 received at audio source input 511 is played back over loudspeakers 503 instead of the audio portion of the audio/video signal received by amplifier 502 via input 506.

Figure 6:
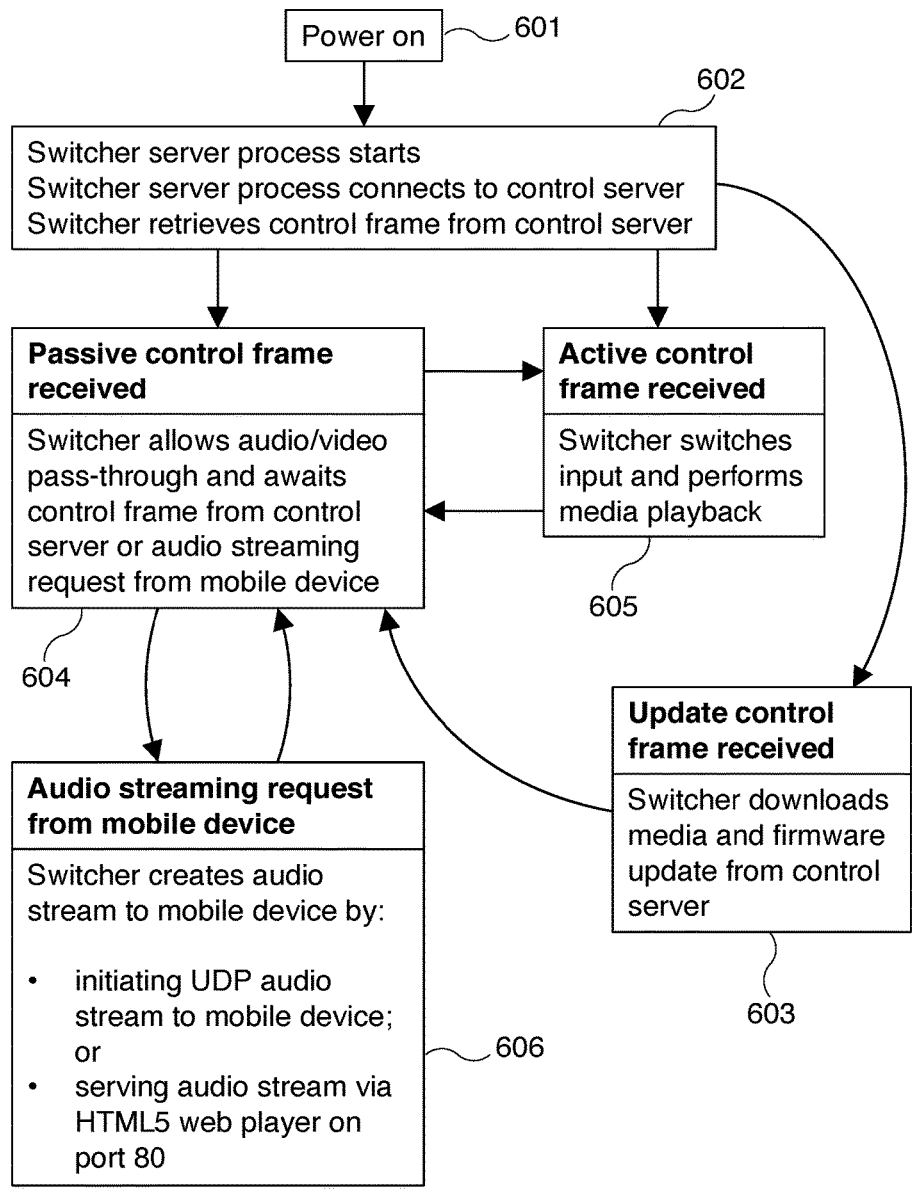
FIG. 6 is a flow chart illustrating the flow of control of software instructions executing on the microprocessor of a switcher according to an embodiment of the present invention.

FIG. 6 is a flow chart illustrating the control flow of software instructions executing on the microprocessor of a switcher 101 according to an embodiment of the present invention. The control flow begins at step 601. At step 601, switcher 101 is powered on and begins executing instructions stored in onboard memory. From step 601, the control flow continues to step 602. At step 602, a server process on switcher 101 starts. The server process connects to control server 302 and retrieves an initial control frame from control server 302. The initial control frame instructs switcher 101 to enter one of three modes: update mode, passive mode, or active mode.

If the initial control frame instructs switcher 101 to enter update mode, the control flow continues to step 603. At step 603, the switcher downloads media (i.e., images, audio, and/or video content), a firmware update, or both from control server 302. From step 603, the control flow continues to step 604. At step 604, the switcher enters passive mode and thereby allows an audio/video signal received via audio/video input 308 to pass through to audio/video output 304 unchanged. At step 604, switcher 101 listens on the network for a subsequent control frame from control server 302 or an audio streaming request from a mobile device 103.

If the initial control frame or a subsequent control frame instructs switcher 101 to enter active mode, the control flow continues to step 605. At step 605, switcher 101 switches the audio/video signal connected to its output from the audio/video signal received via input 308 to the audio/video signal generated onboard switcher 101 and thereby provides media stored on switcher 101 to audio/video output 304. Upon completion of media playback, the control flow returns to step 604.

At step 604, if switcher 101 receives an audio streaming request from a mobile device 103, the control flow continues to step 606. At step 606, switcher 101 initiates the streaming of an audio data stream to mobile device 103 by initiating a UDP audio stream connection to mobile device 103, by serving the audio stream via an HTML5 web player on port 80 to mobile device 103, or by another method of streaming audio. After initiating the streaming of the audio data stream, the control flow returns to step 604 to await further commands or requests.

Figure 7:
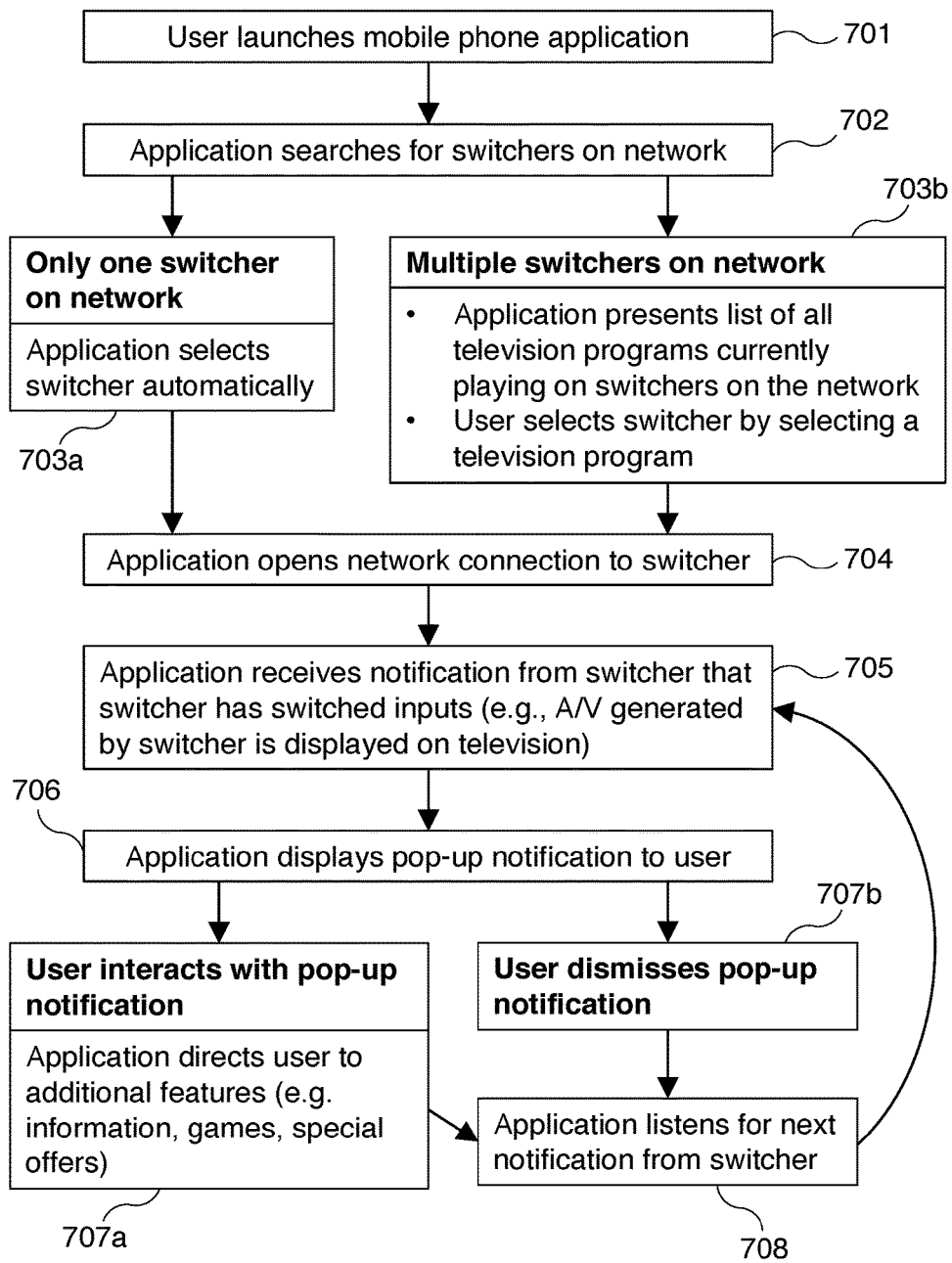
FIG. 7 is a flow chart illustrating the interaction between software instructions executing on the microprocessor of a switcher and software instructions executing on the microprocessor of a mobile device according to an embodiment of the present invention.

FIG. 7 is a flow chart illustrating the control flow of software instructions executing on the microprocessor of a mobile device according to an embodiment of the present invention. The control flow begins at step 701. At step 701, the user launches a mobile application on mobile device 103. From step 701, the control flow continues to step 702. At step 702, the mobile application begins searching for one or more switchers 101 on computer network 102 or 202. Step 702 is complete once the mobile application locates all switchers 101 on computer network 102 or 202, or alternatively, after a defined amount of time (e.g., 30 seconds) elapses without finding additional switchers 101.

From step 702, the control flow continues to either step 703a (if the mobile application locates only one switcher 101) or step 703b (if the mobile application locates multiple switchers 101). At step 703a, the mobile application has located only one switcher 101 on computer network 102 or 202. Therefore, the mobile application selects the switcher 101 that it has located. At step 703b, the mobile application has located more than one switcher 101 on computer network 102 or 202. Therefore, the mobile application presents a list of the television or other audio/video programs currently playing on the switchers 101 it has located to the mobile application user so the user can select the program (and thus, the switcher 101 playing the program) that the user is watching.

From steps 703a or 703b, the control flow continues to step 704. At step 704, the mobile application opens a network connection to the selected switcher 101 and waits to receive notifications from switcher 101 that switcher 101 has switched input signals. From step 704, the control flow continues to step 705. At step 705, the mobile application receives a notification from switcher 101 that switcher 101 has switched input signals (for example, that the audio and video generated by switcher 101 is currently displayed on monitor 301 instead of an audio/video signal received at one of switcher 101's audio/video inputs).

From step 705, the control flow continues to step 706. At step 706, the mobile application displays a pop-up notification to the user indicating that additional content or features are available in connection with the audio and video content currently displayed on monitor 301. From step 706, the control flow continues to either step 707a (if the mobile application user interacts with the pop-up notification) or step 707b (if the user dismisses the pop-up notification). At step 707a, the mobile application user interacts with the pop-up notification (i.e., the user indicates that the user is interested in the additional content or features offered by the mobile application). The mobile application then directs the user to the additional content or features. For example, the mobile application may offer additional information about the program or advertisement that is currently playing, or the mobile application may provide games, special offers, or other content relating to the program or advertisement that is currently playing. At step 707b, the mobile application user dismisses the pop-up notification and the mobile application does not display the additional content or features.

From steps 707a or 707b, the control flow continues to step 708. At step 708, the mobile application listens for and waits to receive the next notification from switcher 101 that switcher 101 has switched input signals. From step 708, the control flow continues to step 705 and the mobile application continues to display new pop-up notifications until the user quits the mobile application or otherwise instructs the mobile application to stop displaying notifications.

Thus, an audio/video source switcher and controller that automatically switches the input signal connected to its output based on a change in an incoming audio/video signal, devices that connect to the switcher, and methods for using the same, are described. Although the present invention has been described with respect to certain specific embodiments, it will be clear to those skilled in the art that the inventive features of the present invention are applicable to other embodiments as well, all of which are intended to fall within the scope of the present invention.

What is claimed is:

1. An audio/video source switching system comprising a control server, a computer network, a mobile device, and a switcher, wherein the switcher comprises:
   a microprocessor;
   a memory;
   computer-readable instructions stored in the memory and executing on the microprocessor;
   a plurality of audio/video source inputs;
   an audio/video output; and
   one or more computer network interfaces;
   wherein the switcher is configured to receive a control frame comprising a control instruction from the control server via the computer network, and in response to the control instruction, to enter one of an update mode, active mode, and passive mode in accordance with the control instruction;
   wherein the update mode obtains audio/video data and updated computer-readable instructions from the control server via the computer network and to store the audio/video data and updated computer-readable instructions in the memory of the switcher;
   wherein the active mode disconnects a first audio/video source input from the audio/video output and connect a second audio/video source input to the audio/video output; and
   wherein the passive mode is listens for an audio streaming request received via the computer network from the mobile device, and in response to the audio streaming request, to stream an audio component of an audio/video signal emitted from the audio/video output to one or more mobile devices via the computer network;
   wherein the switcher is configured to automatically detect a change in a first audio/video signal received via a first audio/video source input, and in response to said detection of the change in the first audio/video signal, to disconnect the first audio/video source input from the audio/video output and connect a second audio/video source input providing a second audio/video signal to the audio/video output; and
   wherein the first audio/video signal comprises a broadcast television signal comprising a first television program segment followed by a first commercial advertisement, wherein the change in the first audio/video signal is a transition from the first television program segment to the first commercial advertisement and wherein the second audio/video signal is a second commercial advertisement different from the first commercial advertisement.

2. The audio/video source switching system of claim 1 wherein the detection of the change in the audio/video signal comprises detection of a volume level of an audio component of the audio/video signal that drops below a threshold volume level.

3. The audio/video source switching system of claim 2 wherein the detection of the change in the first audio/video signal further comprises detection of a brightness level of a video component of the first audio/video signal that drops below a threshold brightness level after the volume level drops below the threshold volume level.

4. The audio/video source switching system of claim 3 wherein the detection of the change in the first audio/video signal further comprises:
- capturing one or more video frames from a video component of the audio/video signal after the brightness level drops below the threshold brightness level;
- processing the one or more captured video frames to produce a hash value;
- looking up the hash value in a database; and
- determining that there has been a change in the audio/video signal if the hash value is found in the database.

5. The audio/video source switching system of claim 4 further comprising a control server, wherein the database is located on the control server and wherein the control server is connected to the switcher via a computer network.

6. The audio/video source switching system of claim 1 wherein the second audio/video signal is generated internally in the switcher according to the computer-readable instructions.

7. The audio/video source switching system of claim 1 further comprising a microphone input wherein the switcher is configured to receive audio data from the microphone input, detect key words, phrases, and sounds in the received audio data, and in response to said detection, send notifications to one or more mobile devices via a computer network according to computer-readable instructions stored in the memory and executing on the microprocessor.

8. A method performed by an audio/video source switcher according to computer-readable instructions stored in a memory of the switcher comprising the steps of:
- receiving a control frame comprising a control instruction from a control server, and in response to the control instruction, selecting among the three modes for an update mode, active mode, and passive mode, entering one of an update mode, active mode, and passive mode in accordance with the control instruction;
- wherein the update mode comprises the steps of obtaining audio/ video data and updated computer-readable instructions from the control server and storing the audio/video data and updated computer-readable instructions in the memory of the switcher;
- wherein the active mode comprises the steps of disconnecting a first audio/video source input from an audio/video output of the switcher and connecting a second audio/video source input to the audio/video output; and
- wherein the passive mode comprises the steps of listening for an audio streaming request received via a computer network from a mobile device, and in response to the audio streaming request, streaming an audio component of an audio/video signal emitted from the audio/video output to one or more mobile devices via the computer network;
- further comprising the steps of:
- detecting a change in a first audio/video signal received via a first audio/video source input, said first audio/video source input being connected to the audio/video output;
- determining that the change in the first audio/video signal meets pre-determined criteria to cause the switcher to switch which of the audio/video source inputs is connected to the audio/video output;
- disconnecting the first audio/video source input from the audio/video output; and
- connecting a second audio/video source input comprising a second audio/video signal to the audio/video output;
- wherein the first audio/video signal comprises a broadcast television signal comprising a first television program segment followed by a first commercial advertisement, wherein the change in the first audio/video signal is a transition from the first television program segment to the first commercial advertisement and wherein the second audio/video signal is a second commercial advertisement different from the first commercial advertisement.

9. The method of claim 8 wherein the step of detecting a change in a first audio/video signal received via a first audio/video source input comprises the step of detecting a volume level of an audio component of the first audio/video signal that drops below a threshold volume level.

10. The method of claim 9 wherein the step of detecting a change in the first audio/video signal further comprises the step of detecting a brightness level of a video component of the first audio/video signal that drops below a threshold brightness level after the volume level drops below the threshold volume level.

11. The method of claim 10 wherein the step of detecting a change in the first audio/video signal further comprises the steps of:
- capturing one or more video frames from a video component of the first audio/video signal after the brightness level drops below the threshold brightness level;
- processing the one or more captured video frames to produce a hash value;
- looking up the hash value in a database; and
- determining that there has been a change in the audio/video signal if the hash value is found in the database.

12. The method of claim 11 wherein the step of looking up the hash value in a database comprises the steps of:
- connecting to a database server via a computer network;
- querying the database server for the hash value; and
- receiving the result of the query from the database server.

13. The method of claim 8 further comprising the step of generating the second audio/video signal according to computer-readable instructions stored in a memory of the switcher and executing on a microprocessor of the switcher.

14. The method of claim 8 further comprising the steps of receiving audio data from a microphone input, detecting key words, phrases, and sounds in the received audio data, and in response to said detection, sending notifications to one or more mobile devices connected to the switcher via a computer network.

15. The audio/video source switching system of claim 1 wherein the mobile device is configured to receive an input switch notification from the switcher that the switcher has disconnected the first audio/video source input from the audio/video output and connect the second audio/video source input to the audio/video output, and in response to said input switch notification, to display a pop-up notification on a display of the mobile device.

16. The audio/video source switching system of claim 15 wherein the pop-up notification comprises additional content or features in connection with said second audio/video signal of the second audio/video source input.

17. The method of claim 8 further comprising the steps of sending an input switch notification to a mobile device that the switcher has disconnected the first audio/video source input from the audio/video output and connected the second audio/video source input to the audio/video output, said input switch notification causing the mobile device to display a pop-up notification.

18. The method of claim 17 wherein the pop-up notification comprises additional content and features in connection with said second audio/video signal of the second audio/video source input.

* * * * *